United States Patent

Moranduzzo et al.

[11] 4,400,939
[45] Aug. 30, 1983

[54] DRIVE UNITS

[75] Inventors: Giampaolo Moranduzzo, Tradate, Italy; Theodor Abels; Hans-Waldemar Stuhr, both of Aschaffenburg, Fed. Rep. of Germany

[73] Assignee: Linde Aktiengesellschaft, Hollriegelskreuth, Fed. Rep. of Germany

[21] Appl. No.: 209,257

[22] Filed: Nov. 21, 1980

[30] Foreign Application Priority Data

Nov. 23, 1979 [IT] Italy .............................. 27506 A/79
Sep. 18, 1980 [DE] Fed. Rep. of Germany ....... 3035152

[51] Int. Cl.³ ............................................... F16H 39/46
[52] U.S. Cl. ........................................ 60/431; 60/444; 60/449; 60/465; 60/486
[58] Field of Search ................. 60/431, 443, 444, 449, 60/465, 486

[56] References Cited

U.S. PATENT DOCUMENTS

| | | | |
|---|---|---|---|
| 3,214,901 | 11/1965 | Iverson | 60/431 |
| 3,214,911 | 11/1965 | Kempson | 60/431 |
| 3,788,774 | 1/1974 | Roesslein | 60/444 |
| 3,817,033 | 6/1974 | Appel et al. | 60/444 |
| 3,903,756 | 9/1975 | Hamma | 60/431 |
| 3,913,325 | 10/1975 | Miyao | 60/431 |
| 3,939,656 | 2/1976 | Goldfein | 60/444 |
| 3,969,896 | 7/1976 | Louis | 60/431 |
| 3,986,358 | 10/1976 | Hoffmann | 60/449 |
| 3,987,625 | 10/1976 | Swatty et al. | 60/431 |
| 4,168,612 | 9/1979 | Nikolaus | 60/431 |

Primary Examiner—George L. Walton
Attorney, Agent, or Firm—Buell, Blenko, Ziesenheim & Beck

[57] ABSTRACT

A drive unit is provided consisting of an internal combustion engine, a continuously variable transmission unit and a fluid operated regulating assembly interconnecting said internal combustion engine and transmission and operated by a single manual control. A second manual control may be provided for interconnecting the engine and a stroke mechanism drive independently of the transmission for operating an auxiliary hydraulic or like circuit.

12 Claims, 2 Drawing Figures

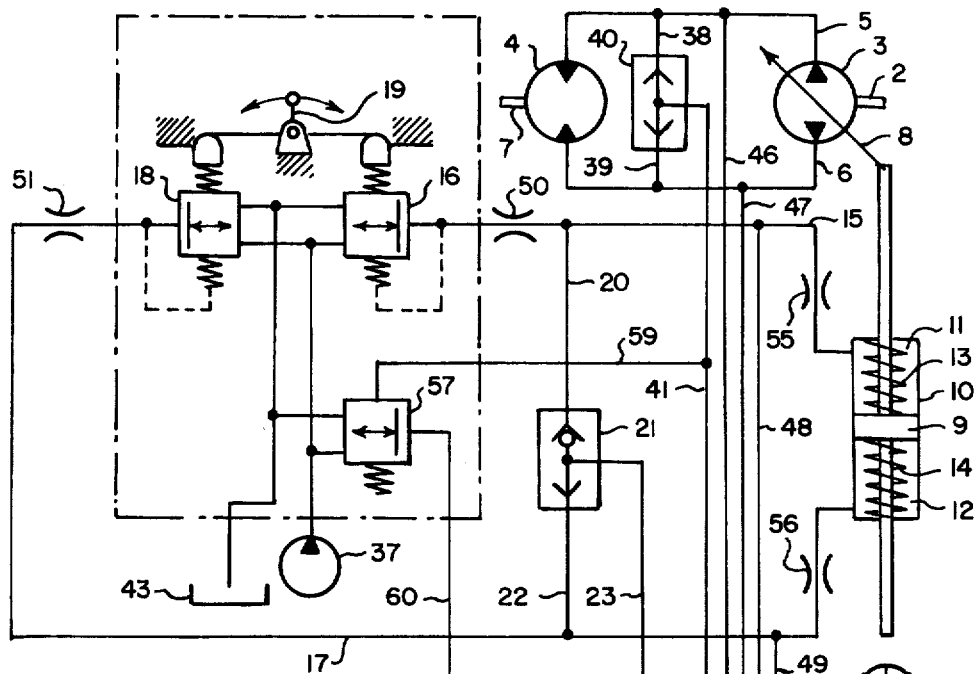
Fig.1.
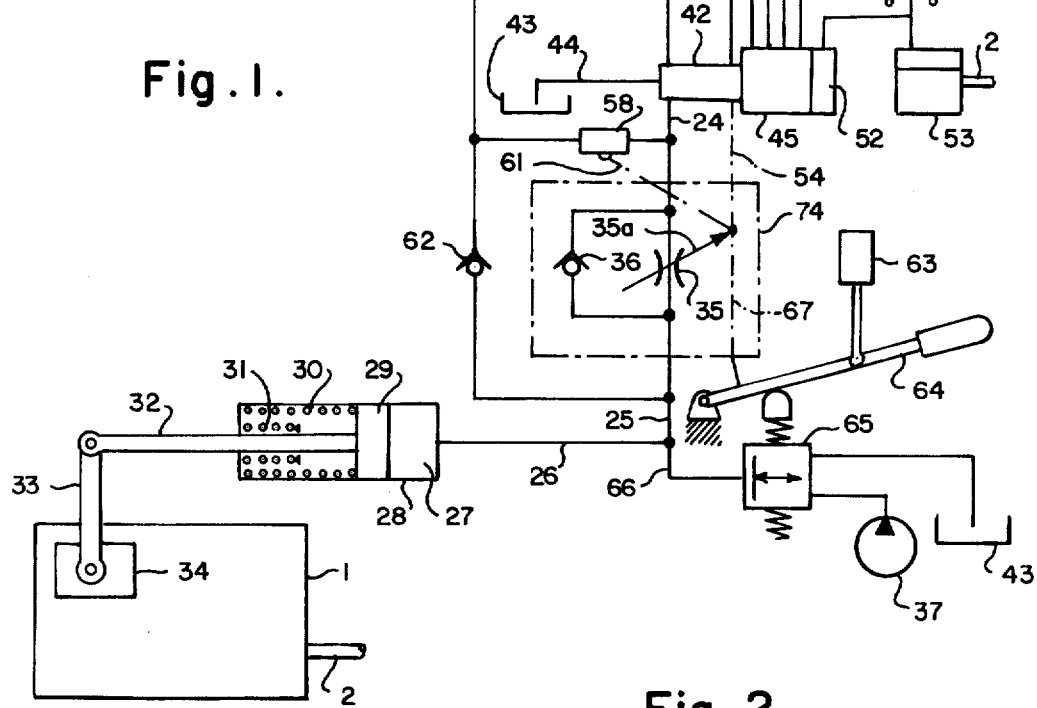
Fig.2.
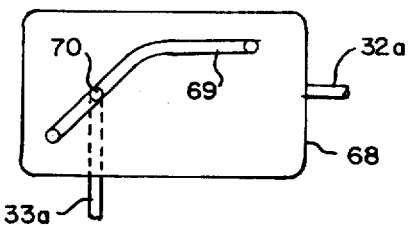

DRIVE UNITS

The present invention relates to drive units and particularly to a drive unit consisting of an internal combustion engine, a continuously variable transmission unit and a regulating assembly interconnecting said internal combustion engine and transmission.

Drive assemblies made up of internal combustion engines and continuously variable transmissions are old in and of themselves, controlling or regulating devices by which each can be individually controlled are known.

The present invention concerns a drive unit consisting of an internal combustion engine and a continuously variable, preferably hydrostatic transmission, whose regulating element is in operative connection with an adjusting or control piston capable of sliding in a control cylinder, and presses against a spring on one side and is acted upon by a control-pressure medium on the other, in which case the pressure of this control-pressure medium can be regulated arbitrarily or as a function of another value by means of a control-pressure pick-off. Such a control arrangement is known through German published specification No. 20 01 701. In the drive units for engines or vehicles of this type known to date the hydrostatic transmission unit is controlled manually by the attendant, on the other hand, by the control-pressure pick-off, and the internal-combustion engine, on the other hand is contrary by means of another manual actuation element. However, an arrangement or arrangements are already known in which only one manual actuation element is provided and both the internal-combustion engine and the hydrostatic transmission are regulated by means of mechanical linkages (DE-PS No. 15 26 528). The installation and adjustment of this linkage are frequently quite expensive and complicated procedures, especially if the internal-combustion engine and the hydrostatic transmission or at least a portion of them are quite far from each other and from the work site of the attendant, e.g., in the case of a powered vehicle, from the driver's seat. Even if the mechanical linkage is in the form of cables or Bowden control cables in flexible steel conduits or similar actuation arrangements, the shortcomings are not eliminated because the application possibilities for such traction transfer elements are limited due to the large radius of curvature required, the sensitivity to dirt and dust, and the danger of kinking during operation. An additional problem is that such a mechanical linkage must be constructed new each time if the drive system is to be used for a machine of different dimensions and/or other spatial arrangement of the internal-combustion engine, hydrostatic transmission, and the position of the attendant.

The present invention proposes to design a conversion system for the control signals from the arbitrarily actuatable element to the hydrostatic transmission and to the internal-combustion engine such that the same conversion system with the same elements and merely modified pipelines or hose lines can be used, independently of the dimensions of the machine or the powered vehicle and the position of the attendant's station relative to the internal-combustion engine and hydraulic pumps and possibly adjustable hydraulic motors.

The invention, thus, concerns not only a drive unit as such, but also a control arrangement for a drive unit consisting of internal-combustion engine and hydrostatic transmission, in which case only the pump or pumps and motor or motors can be regulatable in the case of the hydrostatic transmission and is or are provided with a hydraulic control arrangement, in which the position of the control member is dependent on a control pressure acting on the control element, in which pressure is regulated in a control-pressure pick-off, arbitrarily or as a function of a regulating arrangement.

This problem is resolved according to the invention by also connecting the control element of the internal-combustion engine with a control piston capable of sliding in a control cylinder. This piston presses against a spring and is acted upon on the other side by a control-pressure medium whose pressure is determined by the control-pressure pick-off for regulating the hydrostatic transmission. Independently of the spatial positioning and the distance from each other of the attendant's station, internal-combustion engine, and hydrostatic transmission, the attendant's station, internal-combustion engine and pumps and possibly motors of the hydrostatic transmission thus need only be connected with each other by means of control-pressure lines. However, the latter can be readily installed even under unfavorable spatial conditions and for relatively large distances. An additional advantage is that the same control elements, namely, the same control-pressure pick-offs and control cylinders, can be used, quite independently of the size of the internal-combustion engine and the hydrostatic transmission. For this purpose, in particular, the control pistons can act indirectly through servo power amplification arrangements.

An additional advantage lies in the fact that such a control system can be readily designed for a drive unit in such a manner that internal-combustion engine and hydrostatic transmission are regulated in common optimally with regard to each other such that, depending on the setting of the control system, fuel consumption (overall efficiency, including the transmission efficiency which is dependent on the drive r.p.m.) or noise generation or exhaust values of the internal-combustion engine or the maximum power output at the transmission output shaft can be optimized.

It must be taken into account that a drive unit is already known in which an additional constant pump produces an output stream that is divided into two streams, in which case first a fixed and then an adjustable restrictor are installed in each line carrying a stream, one behind the other in the direction of flow, and the two restrictors are coupled with each other as a function of the transmission load and the line carrying one of the streams is connected to the control element of the pump of the hydrostatic transmission and the line carrying the other stream is connected to the control element of the internal-combustion engine (DE-OS No. 19 20 859).

With the invention a synchronized hydraulic adjustment or regulation is thus achieved between the hydrostatic transmission and the control element of the internal-combustion engine. This solution goes far beyond the replacement of a mechanical linkage by a hydrostatic linkage, all the more so since a hydrostatic linkage with an enclosed fluid volume operates with the result that the adjustment transferred is altered in the case of leakage losses. It is possible to develop a control arrangement and arrange its individual components at convenient sites of the overall machine arrangement, indeed, at various sites in the case of different machines. On the whole, commercially available components are used and they can be readily installed in the transmission and the internal-combustion engine. Because the control-pressure lines carry only a low pressure and have small diameters, they can be readily incorporated and slight subsequent modifications to the machine are also possible.

This basic principle of the invention also facilitates numerous additional expedient refinements in various directions, especially with regard to a function such that the adjustment of the internal-combustion engine to an adjustment and power input of the hydrostatic transmission and/or to the r.p.m. and torque required at the transmission output shaft is automatically tuned optimally, that is, that a correlation of the individual adjustment positions that corresponds optimally to the prevailing operational requirements automatically results.

The power input characteristics of hydrostatic transmissions, both those regulated only on the primary side and also those regulated on both the primary and secondary sides are known (see, e.g., *Principles of Hydrostatic Transmissions—Construction, Mode of Operation, and Special Applications* in *Linde Berichte aus Technik und Wissenschaft*, No. 42, November 1977, p. 29, especially pp. 47, 51 and 59) (Linde Reports on Science and Technology, No. 27/1978, p. 29) and the corresponding design of the mechanical linkage connecting the control elements of an internal-combustion engine and a hydrostatic transmission is also already known (see DE-PS No. 15 26 528, Col. 4). A particularly advantageous conversion function can be achieved with an arrangement according to the present invention if it is designed so that the stiffness of the spring in the control cylinder that is assigned to the control element of the hydrostatic transmission and the stiffness of the spring in the control cylinder assigned to the control element of the internal-combustion engine are such that the control piston connected with the control element of the internal-combustion engine reaches its end position when the control pressure has reached a level at which the control piston connected with the control element of the pump of the hydrostatic transmission has reached a middle position and the control element of the pump assumes the control position at which the pump receives the full power furnished by the internal-combustion engine, so that at this level of the control pressure the internal-combustion engine is capable of furnishing its maximum power and the hydrostatic transmission is capable of receiving this power if, with an additional increase in the control pressure at constant power, the drive r.p.m. of the hydrostatic transmission is increased and thus the drive torque corresponding to the hyperbolic characteristic is reduced. In the case of a transport drive an optimal conversion in the hydrostatic transmission toward the traction hyperbola, which is determined by the law, "the product of the feed flow and feed pressure is constant," results. Full motor power is impossible at low speeds in this hyperbolic range. On the one hand, a limit is established for the feed pressure in the hydrostatic transmission by a pressure-limiting valve, and, on the other hand, a limit that is below this limit results with a proper designing of the powered vehicle due to the fact that the wheels of the vehicle slip with this torque. When the efficiency is disregarded, the drive power taken up by the hydrostatic transmission drops linearly to zero in the lower speed range. On the other hand, the internal-combustion engine must always run with a minimum r.p.m. in order to be able to furnish a torque at all. With an expedient compromise between (1) maximum acceleration; (2) minimum fuel consumption; and (3) low noise development; it is advantageous to provide the course of the drive power over the drive r.p.m. from the ideal, beginning at the origin, rising sharply linearly up to the maximum motor power and then remaining constant, with a deviating course: on the one hand by the fact that the rising branch can be curved with regard to the slip limit of the vehicle's wheels, and on the other through the fact that with regard to the internal-combustion engine the steeply rising branch does not pass through the origin, i.e. it does not leave the point r.p.m.-zero, power-zero. With regard to the dependence of the hydrostatic transmission efficiency on the drive r.p.m., it may also be advantageous not to allow the steep branch of the power-drive r.p.m. curve to go up to maximum motor power, but to joint a flat-rising branch going up to the maximum motor power to it. In the case of a hydrostatic transmission, in which both the pump and also the motor or motors are adjustable, the swinging back of the hydraulic motor expediently takes place at full or at least approximately full r.p.m. of the internal-combustion engine.

With an appropriate design of the control-pressure pickoff of the control arrangement of a drive unit according to the invention, the course of the control pressure over the path of the actuating element, e.g., pedal, is expediently selected such that beginning from the original position with a short path no control pressure is achieved at all, in order to obtain a correct zero position. With a prescribed pedal travel the control pressure then rises by a jump up to the value at which the transmission begins to swing the pumps out, with increasing control pressure. Pin-point control is thus possible at low travel speeds. A range assigned to low travel speeds is provided, in which the control pressure rises only relatively slightly over the path of the actuating element, while in a range assigned to faster travel speeds the control pressure increases more rapidly with a further swinging out of the actuating element. A control-pressure pickoff that has such control characteristics is known from DE-OS No. 19 39 293. The correlation of the control pressure to the path of actuating element is thus influenced by such a control-pressure pick-off. When such a control-pressure pick-off is used in an arrangement according to the invention, the regulation of both the hydrostatic transmission and the internal-combustion engine is influenced by the pedal path. Be selecting and correlating the spring characteristics as indicated above, the result is that with increasing control pressure the pump of the hydrostatic transmission first swings out and at the same time the internal-combustion engine is adjusted to deliver a greater power until the engine has reached its setting for maximum power delivery, i.e., the spring located in the control cylinder assigned to the engine is fully compressed so that with a further rise in the control pressure only the hydrostatic transmission is adjusted in the direction of an increase in the drive r.p.m. If the hydrostatic transmission is provided not only with an adjustable pump, but also with an adjustable hydraulic motor, the stiffnesses of the springs in the control cylinder assigned to the pump and in the the control cylinder assigned to the motor are tuned to each other in such a manner that at first only the pump is adjusted to its maximum swinging-out position with increasing feed pressure, while in this control-pressure range, due to the pretensioning of the spring in the control cylinder assigned to the hydraulic motor, the control piston capable of sliding in this cylinder no longer moves, while with further increasing control pressure with a fully compressed spring in the control cylinder assigned to the pump the spring in the control cylinder of the hydraulic motor is increasingly compressed so that the hydraulic motor is moved in the direction of a smaller stroke volume per revolution (DE-OS No. 26 52 976, p. 49).

In order to bring about the adjustment of the power-regulating element of the engine in the case of increasing adjustment of the hydrostatic transmission up to at least approximately its maximum conversion in the range below the maximum power output of the engine for adaptation to the transmission efficiency or for other reasons, the engine is regulated along with it also; that is, in order to achieve a bent (non-linear) and in the upper portion also inclined characteristic curve, it is expedient if, according to an additional step of the invention, the spring, against which the control piston connected with the adjusting element of the internal-combustion engine presses, consists of a set of springs of different length. The springs of different length can also advantageously have different stiffnesses. However, it is also sufficient if a second spring comes into play after the first spring compressed has travelled a good portion of its path. The providing of two springs of different length in an element acted upon by a control pressure in order to achieve a bent characteristic curve is known in itself (DE-OS No. 20 38 622), but not in connection with the slide plate of a valve that regulates a consumer of hydraulic energy, while here such a spring arrangement is used for regulating the internal-combustion engine. Instead of a set of springs, a single spring with correspondingly variable characteristics can also be provided, e.g., a coil spring with differentiated coils or a set of different cup springs or the like.

The same effect can also be achieved if only one spring with a linear characteristic curve is used, if a mechanical variable conversion is located between the control piston assigned to the internal-combustion engine and the adjusting element of the engine. Such a mechanical element with a variable conversion function can be a cam or rocker arm, on or in which a tracer point or feeler roll is placed, or an appropriate kinematic lever gearing system, e.g., according to the type of a bent-lever system with appropriate conversion function, can be provided.

Particularly advantageous in the use of the arrangement according to the invention in the case of a hydrostatic transmission operating in a closed circuit with a pump regulatable in both directions, in which case the control piston assigned to the pump is acted upon from both sides by pressure and each side of the control piston is acted upon through a correlated control-pressure line. For adapting a control arrangement for a drive unit according to the invention to such a hydrostatic transmission it is provided with an advantageous further refinement, in that the two control-pressure lines, each of which leads to one side of the control piston connected with the pump, are connected to a reversing valve that joins the line that happens to carry the higher pressure with an additional control-pressure line, which leads to the control cylinder, in which the control piston connected with the internal-combustion engine is capable of sliding.

In the case of a control arrangement for a drive unit according to the invention, a branch is thus provided in the line leaving the control-pressure pick-off, from which branch one branch line leads to the control cylinder assigned to the hydrostatic transmission and the other branch line leads to the control cylinder assigned to the internal-combustion engine. In the case of a transmission unit of the just-mentioned type operating in a closed circuit, this branch is located at the said reversing valve.

According to an advantageous further refinement of the invention, a restrictor is located in the control-pressure line between the said branch and the control cylinder assigned to the internal-combustion engine. Advantageously, this restrictor is adjustable and preferably it is adjustable up to a complete shutoff of the control-pressure line. It is also advantageous if a check valve that opens toward the control cylinder assigned to the internal-combustion engine is installed parallel to this restrictor. Such an arrangement with such a check valve and a restrictor installed in parallel has the advantage that the check valve opens with increasing control pressure and thus transfers the control pressure immediately to the internal-combustion engine, so that with a change in the setting of the hydrostatic transmission in the direction of an increased drive r.p.m. due to the opened check valve, the control pressure is immediately transferred to the control cylinder assigned to the internal-combustion engine, so that the power-regulating element of the engine is also correspondingly adjusted, while with decreasing feed pressure and thus a throttling back of the setting of the hydrostatic transmission to a smaller conversion the said restrictor is actuated so that the adjustment of the engine to a lower power takes place more slowly than the change in conversion of the hydrostatic transmission to a lower power input.

According to another advantageous refinement of the invention, a restrictor is installed in the control-pressure line between the said branch and the control cylinder assigned to the hydrostatic transmission. This restrictor has the effect that with increasing control pressure the internal-combustion engine is first adjusted to a higher power delivery and only then is the hydrostatic transmission adjusted to a higher power input. This is advantageous because in an internal-combustion engine with adjustment to a higher power delivery, the adjusting element is set first and thus the fuel feed is increased, while the actual power delivery is increased only when the increased amount of fuel has been burned in the cylinders and the r.p.m. is possibly increased thereby. In order to facilitate a rapid back-regulation of the hydrostatic transmission, a check valve, which in this case opens toward the control-pressure pick-off, can also be installed in parallel to this restrictor.

A so-called maximum-load regulator is also known, in which the hydrostatic transmission, whose adjustment is predetermined by a control pressure determined by a control-pressure pick-off, is modified to a lower drive r.p.m. and thus a lower power input if the r.p.m. of the engine driving the hydrostatic transmission drops below a predetermined limit value, in which case, with such a drop in the r.p.m, a discharge valve releases control-pressure from the control-pressure line and in which case a restrictor is installed between the outlet of the control-pressure pick-off and the point of connection of the discharge valve so that the amount flowing out through the discharge valve is not immediately replaced by the control-pressure pick-off in maintaining the pressure constant (DE-PS No. 20 01 701). Such an arrangement has the advantage that an overloading of the engine driving the transmission is prevented, since the load on the engine is reduced in the case of a drop in the r.p.m. due to overloading. Such a maximum-load regulating arrangement can also be advantageously associated with a control arrangement for a drive unit according to the invention, in which case, it is provided that the discharge valve element, upon opening of the discharge valve, interrupts the control-pressure line between the point of connection of the discharge valve and the control cylinder assigned to the engine so that the engine is not also set to a lower power with back-regulating of the conversion of the hydrostatic transmission. Since the back-regulation leads precisely to making the power input of the hydrostatic transmission lower than the power that the engine is capable of delivering, the power delivery of the engine may not be reduced in this state of regulation. Therefore, the line leading to the control cylinder assigned to the engine must be closed off when the pressure in the control cylinder assigned to the hydrostatic transmission is reduced by the discharge valve. For this purpose, a pilot valve closing off the control-pressure line can be provided in the latter between the point of connection of the discharge valve and the control cylinder assigned to the engine, in which case this pilot valve is coupled with the discharge valve such that upon or preferably immediately prior to the opening of the discharge valve for the purpose of reducing the control-pressure to the hydrostatic transmission, the control-pressure line leading to the control cylinder assigned to the engine is shut off so that the power delivery of the engine remains at the pre-established value. If the engine was not always adjusted to the maximum power output with engagement of the maximum-load regulator, it can be advantageous if an additional control-pressure pick-off is provided and that is automatically actuated when the discharge valve opens and increases the pressure in the control-pressure line leading to the control cylinder of the engine, to which line this additional control-pressure pick-off is connected, if the setting of the hydrostatic transmission is modified by reducing the control-pressure acting on its control cylinder in the direction of a lower power input, as a result of an r.p.m. decrease in the engine due to its overloading.

According to another advantageous refinement in a hydrostatic transmission operating in closed circuit, this discharge valve element is connected with a pressure-feeler and comparison arrangement, which on the one hand senses the pressure in the two lines of the hydrostatic transmission and, on the other, the pressure in the two controlled pistons for each side of the hydrostatic transmission pump, and then, if in the hydrostatic transmission the pressure in the line, which is determined by the pressure in the one of the two control-pressure lines leading to the control piston of the hydrostatic transmission pump designated as the return line, is higher than the pressure in the line designated by the control-pressure distribution as the feed line, i.e., if the hydrostatic transmission is operating in a braking action, this closure of the line leading to the control cylinder assigned to the engine consequently does not cause the engine to be rapidly swung back to a lower power output during braking operation with decreasing control-pressure, such that it can undertake a drag action during braking operation. Or in another refinement this control-pressure line is shut off and through an additional valve releases the control pressure in the cylinder assigned to the engine, and this as rapidly as possible.

According to another advantageous refinement of the invention, it is provided that the feed pressure in the hydrostatic transmission acts on another control-pressure pick-off and that the control line emerging from this additional control-pressure pick-off is connected to the control line leading to the control cylinder of the engine beyond the restrictor provided in this control line, and that a comparison element is connected to the control-pressure line emerging from this additional control-pressure pick-off, which on the other hand is connected to the control-pressure line between the first control-pressure pick-off and the control cylinder assigned to the engine and which effects a closure of the control-pressure line between this first control-pressure pick-off and the control cylinder assigned to the engine if the control pressure in the line emerging from the additional control-pressure pick-off is higher than the control-pressure pick-off the setting of the adjusting element of the engine is regulated by the increased control pressure of this additional control-pressure pick-off to deliver an increased power, while on the other hand the hydrostatic transmission, as before, is influenced only by the first control-pressure pick-off and thus is set at a lower conversion ratio, i.e., if a certain conversion ratio at the hydrostatic transmission is set by the arbitrarily actuatable first control-pressure pick-off and a very high torque is received at the drive shaft of the hydrostatic transmission and thus the feed pressure in the hydrostatic transmission is raised very sharply, the adjusting element of the engine is adjusted to deliver a greater power, provided it had not yet been reached, by acting on the additional control-pressure pick-off without changing the setting of the hydrostatic transmission.

The control arrangment for a drive unit according to the invention, however, facilitates yet another, particularly advantageous refinement if the machine driven by the hydrostatic transmission, particularly if a vehicular drive is involved. This vehicle presents yet another energy consumer that can be actuated arbitrarily and is also driven by the engine driving the hydrostatic transmission. For example, in the case of a fork-lift vehicle, besides the travel drive which is driven through the hydrostatic transmission, there is also a hydraulic lifting arrangement whose pump is also driven by the engine. For example, a fork-lift advances slowly or stands still when the lifting hydraulic system is actuated. This means that the first-mentioned control-pressure pick-off is set at a low control pressure and thus the engine is set at idling or at least the control-pressure pick-off is set at a low control pressure and thus the engine is set to deliver a low power. If the lifting mechanism is now actuated, such that the hydraulic hoisting pump receives energy, the engine must deliver it. However, the setting established by the first-mentioned control-pressure pick-off does not facilitate this. According to another step of the invention, it is thus provided that the actuating element connected with this additional energy consumer, e.g., the hoisting mechanism drive, is connected with an additional control-pressure pick-off, whose control-pressure line is connected to the control-pressure line leading to the control cylinder of the engine beyond the point at which the latter line can be shut off, e.g., beyond the restrictor that can be set to zero, in which case the actuating element is connected with this closure element, e.g., the restrictor that can be set to zero, such that during actuation of this additional control element the control-pressure line between the hydrostatic transmission and the control cylinder of the engine is shut off.

FIG. 1 shows a schematic diagram of one embodiment of the invention.

FIG. 2 shows a fragmentary diagram of a second embodiment of a connection between the engine control piston and the engine adjustment element, e.g. carburetor.

The internal-combustion engine 1 drives through the shaft 2 the pump 3 of the hydrostatic transmission, whose hydraulic motor 4 is connected with the pump 3 through the two lines 5 and 6 in closed circuit. The drive shaft 7 of the hydraulic motor is connected with the drive train of a vehicle. The adjusting element 8 of pump 3 is connected with a control piston 9, which is capable of sliding in a control cylinder 10, in which a pressure space 11 is formed on one side of the piston 9 and a pressure space 12 is formed on the other side of it, where a spring 13 is installed in the pressure space 11 and a spring 14 is located in the pressure space 12. The pressure space 11 is acted upon through a control-pressure line 15 from a control-pressure pick-off 16. The pressure space 12 is acted upon through a control-pressure line 17 from a control-pressure pick-off 18. The two control-pressure pick-offs 16 and 18 can be controlled by an arbitrarily actuatable actuating element 19, such that one of the two control-pressure pick-offs 16 and 18 is actuated at will.

A branch line 20 connects to the control-pressure line 15. It leads to a reversing valve 21, to which is connected, on the other hand, a branch line 22, which is connected to the control-pressure line 17. The reversing valve connects the two control-pressure lines 15 and 17 carrying the higher pressure with the control-pressure line 23, which is extended by the control-pressure line segments 24 and 25 and 26, such that the control-pressure line segments 23, 24, 25, 26 form a common unit and lead to the pressure space 27 of the control cylinder 28 assigned to the engine 1, in which cylinder a control piston 29 is capable of sliding against the force of a long spring 30 and a short spring 31. The control piston 29 is connected with a piston rod 32, which is connected in an articulated manner with the lever 33, which acts on the power regulating element 34 (e.g. carburetor) of the engine 1.

A throttling check valve element 35 is installed between the line segments 24 and 25; it contains the adjustable restrictor 35a and the check valve 36 installed parallel to it.

The basic form of the control arrangement for a drive unit according to the invention is thus achieved. Its mechanism of action is as follows: When the vehicle is standing still, the power-regulating element 34 of the engine is set at its idling position and the pump 3 is placed in the zero stroke position, the actuating element 19 in the neutral position, and the strikers of the two control-pressure pick-offs 16 and 18 lie against their respective zero stops. If the actuating element 19 is now moved to the right in the drawing, in the clockwise direction, the control-pressure pick-off 16 is actuated and, as a result, the control-pressure medium fed by pump 37 flows through the control-pressure pick-off 16 with a preselected pressure and through the control-pressure line 15 into the pressure space 11 of the control cylinder 10 assigned to the pump 3 and adjusts the pump to an increasingly greater stroke volume per revolution. This has the further result that the pump 3 feeds to the hydraulic motor 4, whose drive shaft 7 now begins to rotate with an r.p.m. corresponding to the feed flow. Simultaneously with the pressure increase in the control-pressure line 15, the pressure increases in the branch line 20 and through the reversing valve 21 in the control-pressure line 23, 24, 25, 26, whereby the check valve 36 is opened. The control pressure from the line 15 thus propagates into the pressure space 27, so that the control piston 29 is shifted against the force of the spring 30. If the spring 30 is compressed to the extent that the control piston 29 also lies against the spring 31, a greater increase in the control pressure is required to shift the control piston 29 by one millimeter than to shift the control piston 29 if it lies only against spring 30. If the springs 30 and 31 are completely compressed, the engine 1 is set at its maximum power output, while the pump 3 has reached the setting at which it is in the position to receive the full power of the engine 1. Now if the control pressure in the control-pressure line 15 is further increased by further actuation of the actuating element 19 and thus of the control-pressure pick-off 16, the out-swing of the pump 3 is increased, so that at constant power output of the engine 1 the feed flow of pump 3 is increased, but the pressure against which the pump 3 can pump is thus also decreased.

If the control-pressure pick-off 16 is again throttled back due to a throttling back of the deflection of the actuating element 19, the pressure of the control-pressure medium in the control line 15 is thus throttled back, with the result that the spring 14 again displaces the control piston 9 in the direction to a smaller deviation of the pump. Because a higher pressure still prevails in the branch line 20 than in the branch line 22, the reversing valve 21 still connects the branch line 20 with the control-pressure line 23, such that the pressure of the control-pressure medium is also reduced in it. By reducing the pressure in the control-pressure line 23, 24, 25, 26, the springs 30 and possibly 31 again displace the control piston 29 into the pressure space 27, such that fluid is expelled from it through the lines 26 and 27, with the result that the check valve 36 closes and the control-pressure medium can flow back through the restrictor 35 into the lines 24, 23 and from there through the reversing valve 21 and the branch line 20 into the control-pressure line 15.

Undesirable r.p.m. changes in the engine 1, which could be caused by rapid changes in movement of the actuating element 19, are avoided by the depicted operative connection between the adjusting element 8 of pump 3 and the power-regulating element 34 of the engine 1. Jerky accelerations or decelerations of the vehicle are also thus avoided, or disadvantageous correlations of the hydrostatic transmission and engine adjustments, as they are possible through erroneous manipulation by the attendant if the engine and the hydrostatic transmission are adjusted individually. The reversing valve 21 is necessary with regard to the fact that the pump 3 can be adjusted in both feed directions over the zero-stroke position, thus independently of whether it is adjusted by the control-pressure pick-off 16 in the forward direction or by the control-pressure pick-off 18 in the backward direction, the engine is always adjusted in the same correlation with the adjustment of the hydrostatic transmission. Different correlations can be achieved through the use of different springs on the two sides of the control piston 9, but also for both directions of rotation, if this is advantageous with regard to the machine.

The power-regulating element 34 can be the injection pump or an injection regulator or the butterfly valve of a carburetor.

A synchronous tuning of the power-regulating element 34 of the engine with the stroke-volume setting of the pump 3 is achieved by the arrangement depicted, or, if so desired, a retardation of the setting of the engine.

In addition, a branch line 38 is connected to the line 5 of the hydrostatic transmission 3, 4, 5, 6 and a branch line 39 is connected to the line 6 of the hydrostatic transmission 3, 4, 5, 6, in which case the two branch lines 38, 39 lead to a reversing valve 40, from which a line 41 leads to the discharge valve element 42. The reversing valve 40 connects the one of the two lines 5 and 6 that acts as the feed line with the line 41, such that the respective feed pressure prevails in a corresponding component element of the discharge valve element 42. If the feed pressure exceeds a prescribed maximum, which lies very slightly below the maximum permissible feed pressure, which is limited by a conventional pressure-limiting valve (not shown in the drawing), the discharge valve element 42 opens a connection between the control-pressure line 23 and the drain line 44, which leads to a pressure-less container 43, and simultaneously cuts off the connection between the control-pressure lines 23 and 24 beyond this discharge point. The result of this is that the control pressure in the line segments 24, 25, and 26 and thus in the control cylinder 28 assigned to the engine 1 remains unchanged while the control pressure in the control-pressure line 23 and thus in the control cylinder 10 assigned to pump 3 drops. The pump is thus adjusted to a smaller stroke volume per revolution so that the maximum permissible pressure is not exceeded, while the engine 1 remains at its previous setting so that it can deliver sufficient power to drive the pump 3 which is working against a high pressure.

However, this function is desired only when the engine 1 is driving the drive shaft 7 and thus the driven vehicle through the hydrostatic transmission 3, 4, 5, 6. If braking is effected through the hydrostatic transmission, the discharge valve element 42 effects a different action. In this operating state the discharge valve element 42 shuts off the control-pressure line 23 and connects the control-pressure line segment 24 with the discharge line 44. The result of this is that the setting of the hydrostatic transmission can still be adjusted for the purpose of regulating the braking action through the control-pressure pick-off 16 or 18, while the control cylinder 28 assigned to the engine 1 is completely relieved of pressure, such that the engine 1 passes to its idling setting and thus can effect the highest possible drag moment. If this setting were not given to the engine 1, fuel would still be supplied to it in the braking state so that the driving moment would be in addition to the braking moment and inadmissible r.p.m. values would thus be reached very rapidly.

It can thus be determined whether the hydrostatic transmission is operating in the driving or in the braking state if a pressure-feeler-and-comparison arrangement 45 is connected to the discharge valve element 42, from arrangement 45 a line 46 is connected to the line 5, a line 47 is connected to the line 6, a line 48 is connected to the control-pressure line 15, and a line 49 is connected to the line 17.

If the control-pressure pick-off 16 is actuated, the control-pressure line 15 carries pressure and the pump 3 is swung out such that it feeds into the line 5 and the hydraulic motor 4 drives the drive shaft 7. If the line 5 and thus the line 46 carry a higher pressure than the line 6 and thus the line 47, and also if the line 15 and thus the line 48 carry a higher pressure than the line 17 and thus the line 49, the vehicle is thus in drive operation in one direction, just as if the control-pressure pick-off 18 is actuated and the line 6 and thus the line 47 carry a higher pressure than the line 5 and thus the line 46 and the line 17 and thus the line 49 carry a higher pressure than the line 15 and thus the line 48. However, if the vehicle is operating in the braking state, the control-pressure line 15 is acted on with pressure and at the same time the line 6 carries a higher pressure than the line 5. This means that in this state the line 48 along with line 15 carry a higher pressure than the line 17 and thus the line 49 and the line 6 and thus the line 47 also carry a higher pressure than the line 5 and thus the line 46. In this operational state the pressure-feeler-and-comparison element 45 establishes the braking state and influences the discharge valve element 42 such that it shuts off the line 23 and the control-pressure line segment 24 connects with the drain line 44. The same is true if the control-pressure pick-off 18 is actuated and the control-pressure line 17 thus carries a pressure, but at the same time the line 5 carries a higher pressure than the line 6.

Thus, if the discharge valve element 42 connects the line 23 with the discharge line 44, the pump 3 is displaced in the direction to its zero-feed position and restrictors 50 and 51 are provided to prevent the control-pressure medium from immediately flowing in with such force that the pressure is maintained constant when the control pressure is discharged from the line 15 or from the line 17 through the control-pressure pick-offs 16 or 18.

An element 52 is also connected to the discharge valve element 42. Element 52 is a regulating apparatus which may be an impulse generator or similar known device which performs the functions hereafter described. This element 52 is in operative connection with an r.p.m. feeler 53, which in turn is connected with the shaft 2. Thus, if the r.p.m. sensor 53 furnishes a signal that the actual r.p.m. is smaller than the rated r.p.m., element 52 sends an impulse to valve element 42 such that valve element 42 closes line 23 from line 24.

This element 53 can be a mechanical centrifugal r.p.m. feeler or tachometer, or it can be an electric r.p.m. feeler controlled by impulses, or it can be a tacho-generator, or it can consist of a constant pump driven by the shaft 2 and a line leading to a restrictor, to which line a pressure-measuring element is connected. The element 52 is also in operative connection (not shown in the diagram) with the power-regulating element 34. Each setting of the power-regulating element 34 corresponds to a definite prescribed r.p.m. of the engine. If the r.p.m. of the engine 1 drops as a result of overloading due to an excessively high torque in the shaft 2, the elements 52, 53 influence the discharge valve element 42 such that the control-pressure line segment 24 is again shut off and the control-pressure line 23 is connected with the discharge line 44 so that the one of the two control-pressure lines 15 or 17 carrying a pressure is relieved and thus the pump 3 of the hydrostatic transmission is shifted in the direction of a smaller stroke-volume per revolution.

The function of the discharge valve element 42, shutting off the control-pressure line segment 24, can take place through a schematically shown operative connection 54 between the discharge valve element 42 and the restrictor 35, which can be closed off to zero, such that if the line 24 is to be shut off, the restrictor 35 is completely closed.

If through actuation of the actuating element 19 one of the control-pressure pick-offs 16 or 18 is acted upon and the pump 3 is thus indirectly shifted to a greater stroke volume per revolution and thus a higher power consumption and the engine 1 is moved to a higher power output, it is advantageous if the engine 1 is given a certain lead, i.e., an increase in the swinging-out of the pump 3 is given a certain lag. The restrictors 55 and 56 are provided in order to achieve this lag or retardation.

It was already stated that if the feed pressure in the line 5 or 6 acting as the feed line exceeds a maximum admissible value, the discharge valve element 42 is actuated through the line 41. In addition to this function (or at least if the power regulating element 34 of the engine 1 has not yet been set to the maximum power output, instead of this function), an arrangement, the essential components of which are the additional control-pressure pick-off 57 and the comparison element 58, can go into action. The additional control-pressure pick-off 57 is acted upon through a branch line 59 by the pressure in the line 41 and thus by the one of the two lines 5 and 6 carrying the higher pressure. The additional control-pressure pick-off 57 produces a control pressure in the control-pressure line 60. If the comparison element 58 determines that the control pressure prevailing in the control-pressure line 60 is higher than the pressure prevailing in the control-pressure line segment 24, it induces a shut off of the restrictor 35 through the operative connection 61, with the result that the higher control pressure prevailing in the line 60 acts through the lines 25 and 26 on the control cylinder 28 assigned to the engine 1 and adjusts the engine 1 to a higher power output so that it can furnish the power consumed by the pump 2 at a higher pressure. A check valve 62 prevents the control-pressure medium from flowing out of the control-pressure line segment 25 if a higher pressure prevails in it than in the control-pressure line 60.

In the vehicle driven by the engine 1 through the hydrostatic transmission 3, 4, 5, 6 there is a stroke arrangement (not shown in the drawing) that is switched in by the arrangements 63, which in turn is actuated by the hand lever 64. When the hand lever 64 is actuated, an additional control-pressure pick-off 65 is actuated, which in turn feeds the control-pressure medium through a control-pressure line 66 into the control-pressure line segment 26 and thus into the control cylinder 28 assigned to the engine 1. Through the operative connection 67 the restrictor 35 is simultaneously closed off, such that the setting of the hydrostatic transmission 3, 4, 5, 6 is still a function only of the setting of one of the first control-pressure pick-offs 16 or 18, while the setting of the engine is influenced only through the control-pressure pick-off 65 and is influenced such that the engine 1 delivers the power that is consumed by the stroke-mechanism drive.

In the form of the invention shown in FIG. 2, the piston rod 32a connected with the control piston 29, essentially corresponding to piston rod 32, is connected with a rocker-arm plate 68 in which a curved recess 69 is provided, in which a contact roller 70 slides; this latter is connected with an adjusting rod 33a that runs in a guide (not shown in the drawing), in which case the adjusting rod 33a acts on the adjusting element 34 of the engine 1. The curve 69 is designed such that with continuously increasing control pressure in the control-pressure line 23, 24, 25, 26, the power-regulating element 34 is first shifted from idling up to maximum power, and then with a further increase in the control pressure and thus a further displacement of the piston rod 32a and thus the rocker-arm plate 68 toward the left in the drawing, the setting of the engine is no longer changed.

In another form of the invention (not shown in the drawing), the curve 69 can be designed such that, beginning from the idling setting of the power-regulating element 34, with increasing pressure the setting of the power-regulating element 34 is first sharply increased and, from a certain point on, is only very slightly increased up to the maximum power output.

The fact that the adjusting element 34 of the engine 1 is also adjusted by means of a control piston 29 acted on by the control pressure also facilitates another form, in which the actuating lever 64 acts mechanically and directly on the adjusting lever 33 such that when the lever 64 is actuated, the adjusting element 34 is set at a greater power. Through the mechanical transfer force the springs 30 and possibly 31 are compressed; however, beyond this, there is no further action on the control system, especially for the transmission.

In the foregoing specification certain preferred practices and embodiments of this invention have been set out, however, it will be understood that this invention may be otherwise embodied within the scope of the following claims.

We claim:

1. In a drive unit consisting of an internal-combustion engine having a speed adjusting element and a continuously variable, preferably hydrostatic transmission unit, having a pump and a regulating element operationally connected with a first adjusting piston capable of sliding in opposite directions from a central position in a first adjusting cylinder and supported against a spring on each side and is acted on by a single regulating pressure medium on one side or the other from said pump, in which case the pressure of this regulating pressure medium can be regulated as a function of a value of said engine or arbitrarily by means of one of a pair of control pressure pick-offs, the improvement comprises a comparison valve means which is a function of the control pressure pick-offs and said engine value, a second adjusting piston capable of sliding in a second adjusting cylinder and supported against spring means and acted upon on the other side by the said single regulating pressure medium, the pressure of which is determined by the control pressure pick-offs or said engine value and means operably connecting said second adjusting piston and said speed adjusting element of the internal combustion engine whereby both the regulating element of the hydrostatic transmission unit and the speed adjusting element of the engine are controlled by the said single regulating pressure.

2. In a drive unit according to claim 1, characterized in that the stiffness of the spring in the second adjusting cylinder assigned to the internal-combustion engine on the the one hand, and the stiffness of the spring in the first adjusting cylinder assigned to the hydrostatic drive transmission on the other, are such that the second adjusting piston connected with the adjusting element of the internal-combustion engine reaches its end position at a pressure of the regulating pressure medium at which an adjusting element of the pump of the hydrostatic transmission has reached a position in the middle of the adjustment range, at which the pump receives the full power furnished by the internal-combustion engine.

3. In a drive unit according to claim 1 or 2, characterized in that there is a variable mechanical displacement relation between the second adjusting piston assigned to the internal-combustion engine and the speed adjusting element of the internal-combustion engine.

4. In a drive unit according to claim 3, characterized in that the conversion consists of a curve with a tracer point or feeler.

5. In a drive unit according to claim 1, with a hydrostatic transmission drive operating in a closed circuit and with said pump being adjustable in both conveyance directions, in which case the first adjusting piston assigned to the pump can be acted upon through two regulating control pressure lines one connected to each side of said first cylinder on opposite sides of said first piston, both said control-pressure lines, a reversing valve connected to said two control pressure lines and a exiting from the reversing valve intermediate ends connected to the second adjusting cylinder assigned to the adjusting element of the internal-combustion engine and connected through said valve with one of said two pressure control lines at all times.

6. A drive unit according to claim 1 wherein the regulating pressure medium is delivered through a control pressure line leading to the first adjusting piston of the hydrostatic drive on the one hand and a control pressure line leading to the second adjusting piston of the internal combustion engine, which lines branch off from a point and a restrictor is located in the control pressure line between said point and the second adjusting piston of the internal combustion engine, whereby the first adjusting piston is caused to lag relatively to the second adjusting piston to permit the engine speed to lead the hydrostatic drive speed.

7. In a drive unit according to claim 6, characterized in that the restrictor is adjustable.

8. In a drive unit according to claim 7, characterized in that the restrictor is adjustable up to complete closure of the line.

9. In a drive unit according to claim 7, characterized in that a check valve opening to the second adjusting cylinder assigned to the internal-combustion engine is installed parallel to the restrictor.

10. In a drive unit according to claim 1, characterized in that a restrictor is located in the control-pressure line between a branching point, from which a first branch line leads to the first control cylinder assigned to the hydrostatic transmission and a second branch line leads to the second control cylinder assigned to the internal-combustion engine.

11. In a drive unit consisting of an internal-combustion engine having a speed adjusting element and a continuously variable, preferably hydrostatic transmission unit, having a pump and a first regulating element operationally connected with a first adjusting piston capable of sliding in opposite directions from a central position in a first adjusting cylinder and supported against a spring on each side and is acted on by a regulating pressure medium on one side or the other from said pump, in which case the pressure of this regulating pressure medium can be regulated as a function of a value of said engine or arbitrarily by means of one of a pair of control pressure pick-offs, the improvement which comprises a comparison valve means which is a function of the control pressure pick-offs and said engine value, a second adjusting piston capable of sliding in a second adjusting cylinder and supported against spring means and acted upon on the other side by the said regulating pressure medium, the pressure of which is determined by the control pressure pick-offs or said engine value and means means connecting said second adjusting piston and said speed adjusting element of the internal combustion engine, said hydrostatic transmission being provided with said regulating element and said comparison valve means which includes a discharge valve element in a control-pressure line selectively connected to pressure medium from said first adjusting piston sides and operably connected to said regulating element so that when the engine value such as the r.p.m. of the internal-combustion engine drops below a set limiting value, said valve element vents the pressure medium to the first adjusting cylinder assigned to the hydrostatic transmission thus lowering the pressure and closes the control pressure line connected to the second cylinder which is assigned to the internal-combustion engine so that the pressure medium is blocked to said second cylinder.

12. In a drive unit according to claim 11, wherein a second source of hydraulic fluid under pressure is driven by the engine and connected to one side of the first adjusting cylinder and a third control-pressure pick-off is provided operatively connected to said first control-pressure pick-off whereby when the r.p.m. of the internal-combustion engine rises to drive said second source of fluid the speed of the hydrostatic transmission is varied as a result of actuation of the second control-pressure pick-off, such that the r.p.m. of a drive shaft connecting the engine and the transmission remains constant at the value set prior to actuation of the second control-pressure pick-off or at the value set by the first control-pressure pick-off.

* * * * *